US010793098B2

(12) United States Patent
Malapati et al.

(10) Patent No.: US 10,793,098 B2
(45) Date of Patent: Oct. 6, 2020

(54) VEHICLE AIRBAG

(71) Applicant: Ford Global Technologies, LLC, Dearborn, MI (US)

(72) Inventors: Srinivas Reddy Malapati, Novi, MI (US); Huberto Archundia, Toluca (MX); Kevin Siasoco, Ann Arbor, MI (US); Matt Alan Niesluchowski, Clarkston, MI (US); James Robert Chascsa, II, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/966,980

(22) Filed: Apr. 30, 2018

(65) Prior Publication Data
US 2019/0329728 A1    Oct. 31, 2019

(51) Int. Cl.
| B60R 21/2338 | (2011.01) |
| B60R 21/239  | (2006.01) |
| B60R 21/0136 | (2006.01) |
| B60R 21/264  | (2006.01) |
| B60R 21/01   | (2006.01) |

(52) U.S. Cl.
CPC ...... *B60R 21/2338* (2013.01); *B60R 21/0136* (2013.01); *B60R 21/239* (2013.01); *B60R 21/264* (2013.01); *B60R 2021/01211* (2013.01); *B60R 2021/23382* (2013.01)

(58) Field of Classification Search
CPC ............ B60R 21/0136; B60R 21/2338; B60R 21/239; B60R 21/264; B60R 2021/01211; B60R 2021/23382; B60R 2021/23384; B60R 2021/2395
See application file for complete search history.

(56) References Cited

U.S. PATENT DOCUMENTS

| 6,189,928 | B1 * | 2/2001 | Sommer | B60R 21/233 280/731 |
| 7,017,945 | B2 | 3/2006 | DePottey et al. | |
| 7,954,850 | B2 | 6/2011 | Fischer et al. | |
| 8,196,955 | B2 | 6/2012 | Mendez | |
| 8,226,119 | B2 * | 7/2012 | Dong | B60R 21/2338 280/743.2 |
| 9,108,590 | B2 | 8/2015 | Williams | |
| 9,205,798 | B1 * | 12/2015 | Jindal | B60R 21/16 |
| 9,725,065 | B2 | 8/2017 | Roychoudhury et al. | |
| 9,994,191 | B2 * | 6/2018 | Kalliske | B60R 21/36 |
| 2004/0051286 | A1 * | 3/2004 | Fischer | B60R 21/233 280/739 |
| 2004/0075261 | A1 * | 4/2004 | Damian | B60R 21/233 280/743.2 |

(Continued)

FOREIGN PATENT DOCUMENTS

WO    2017199851 A1    11/2017

*Primary Examiner* — Barry Gooden, Jr.
(74) *Attorney, Agent, or Firm* — Frank A. MacKenzie; Bejin Bieneman PLC (57) ABSTRACT

An airbag assembly includes a housing and an airbag. The airbag is supported by the housing and includes a vent. The airbag assembly includes a tether supported by the housing and fixed to the vent. The airbag assembly includes a tether release operatively coupled to the tether. The airbag assembly includes a tether retractor supported by the housing and fixed to the tether.

19 Claims, 9 Drawing Sheets

(56) References Cited

U.S. PATENT DOCUMENTS

| | | | |
|---|---|---|---|
| 2004/0090053 A1* | 5/2004 | White | B60R 21/01528 280/735 |
| 2006/0290117 A1* | 12/2006 | Fischer | B60R 21/2338 280/739 |
| 2007/0102911 A1* | 5/2007 | Hall | B60R 21/2338 280/739 |
| 2007/0145729 A1* | 6/2007 | Ishiguro | B60R 21/239 280/739 |
| 2008/0284147 A1* | 11/2008 | Goto | B60R 21/2338 280/736 |
| 2009/0302588 A1* | 12/2009 | Schramm | B60R 21/233 280/743.2 |
| 2010/0109306 A1* | 5/2010 | Dong | B60R 21/2338 280/743.2 |
| 2011/0285115 A1* | 11/2011 | Putala | B60R 21/213 280/730.2 |
| 2014/0027195 A1* | 1/2014 | Kalliske | B60R 21/36 180/271 |
| 2015/0130173 A1* | 5/2015 | Biller | B60R 21/04 280/736 |
| 2017/0015266 A1* | 1/2017 | El-Jawahri | B60R 21/01512 |
| 2017/0096118 A1* | 4/2017 | Kruse | B60R 21/0136 |
| 2017/0217399 A1* | 8/2017 | Patel | B60R 21/233 |
| 2019/0118759 A1* | 4/2019 | Kobayashi | B60R 21/239 |
| 2019/0248322 A1* | 8/2019 | Herzenstiel | B60R 21/2338 |
| 2020/0017061 A1* | 1/2020 | Rutgersson | B60R 21/233 |

\* cited by examiner

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

An airbag assembly includes a housing and an airbag. The airbag is supported by the housing and includes a vent. The airbag assembly includes a tether supported by the housing and fixed to the vent. The airbag assembly includes a tether release operatively coupled to the tether. The airbag assembly includes a tether retractor supported by the housing and fixed to the tether.

The airbag may include a second vent, and the airbag assembly may include a second tether supported by the housing and fixed to the second vent, and a second tether release operatively coupled to the second tether.

The tether retractor may include an actuator and a cord extending from the actuator to both the tether and the second tether.

The airbag may be inflatable to an inflated position and define a chamber between the vent and the second vent in the inflated position.

The airbag assembly may include a processor and a memory storing instructions executable by the processor to actuate the tether release and then actuate the tether retractor.

The tether release may extend from the housing to the tether.

The tether retractor may include an actuator and a cord connecting the actuator to the vent.

The actuator may be a pyrotechnic actuator.

A vehicle includes a housing and an airbag. The airbag is supported by the housing and includes a vent. The vehicle includes a tether supported by the housing and fixed to the vent. The vehicle includes a tether release operatively coupled to the tether. The vehicle includes a tether retractor supported by the housing and fixed to the tether. The vehicle includes a processor a memory storing instructions executable by the processor to inflate the airbag in response to detecting a vehicle impact.

The memory may further store instructions to actuate the tether release and then actuate the tether retractor.

The memory may further store instructions to identify an amount of time to wait between actuation of the tether release and the tether retractor based on a detected size of a vehicle occupant.

The airbag may include a second vent, and the vehicle may include a second tether supported by the housing and fixed to the second vent, and a second tether release operatively coupled to the second tether.

The airbag may be inflatable to an inflated position and define a chamber between the vent and the second vent along a cross-vehicle axis in the inflated position.

The memory may further store instructions to actuate one of the tether release or the second tether release based on a detected direction of the vehicle impact.

The memory may further store instructions to actuate one of the tether release or the second tether release based on a detected position of a vehicle occupant.

The tether retractor may include an actuator and a cord extending from the actuator to both the tether and the second tether.

The memory may further store instructions to actuate the tether release and then actuate the tether retractor based on a detected position of a vehicle occupant.

The tether release may extend from the housing to the tether.

The tether retractor may include an actuator and a cord connecting the actuator to the vent.

With reference to the Figures, wherein like numerals indicate like parts throughout the several views, an airbag assembly 20 for a vehicle 22 includes a housing 24. The airbag assembly 20 includes an airbag 26 supported by the housing 24 and including a first vent 28. The airbag assembly 20 includes a first tether 30 supported by the housing 24 and fixed to the first vent 28. The airbag assembly 20 includes a first tether release 32 operatively coupled to the first tether 30. The first tether release 32 may release the first tether 30 and permit the first vent 28 to open. The airbag assembly 20 includes a tether retractor 34 supported by the housing 24 and fixed to the first tether 30. The tether retractor 34 may retract the first tether 30 and close the first vent 28.

The airbag assembly 20 controls kinematics of an occupant 39 of the vehicle 22 by selectively providing variable firmness to the airbag 26 via control of the first vent 28 with the first tether release 32 and the tether retractor 34 to open and close the first vent 28. In other words, the airbag 26 in the inflated position is initially softer while the first tether 30 is released and the first vent 28 is in an open position, and then the airbag 26 in the inflated position is firmer while the first tether 30 is retracted and the first vent 28 is in a closed position. The first vent 28 may be controlled based on a size of the occupant 39, e.g., to provide a softer airbag 26 for a smaller occupant and a firmer airbag 26 for a larger occupant. The first vent 28 and/or second vent 58 may be controlled based on a position of the occupant 39, e.g., such that the airbag 26 is initially softer, and then firmer when the occupant 39 is within a threshold distance of an instrument panel 28 of the vehicle 22.

The airbag assembly 20 may include any suitable number of vents for selectively controlling the firmness of various portions of the airbag 26. As an example, the airbag assembly 20 may include a second vent 58. The second vent 58 may be opposite the first vent 28. The numerical adjectives "first," "second," etc., are used merely as identifiers, and are not intended to indicate order or relative importance. In the example shown in the Figures, the second vent 58 is on a right side of the airbag 26 and the first vent 28 is on a left side of the airbag 26. The airbag assembly 20 may include a second tether 60 supported by the housing 24 and fixed to the second vent 58. The airbag assembly 20 may include a second tether release 62 operatively coupled to the second tether 60. The second tether release 62 may release the second tether 60 and permit the second vent 28 to open. The tether retractor 34 may be fixed to the second tether 60. The tether retractor 34 may retract the second tether 60 and close the second vent 58. The second vent 58, second tether 60, and second tether release 62 may be identical to, or different than the first vent 28, first tether 30, and first tether release 32, respectively.

In this example including both vents 28, 58, the airbag assembly 20 controls kinematics of an occupant 39 of the vehicle 22 by selectively providing variable firmness to the airbag 26, e.g., at sides of the airbag 26, via control of the first vent 28 with the first tether release 32 and the tether retractor 34 to open and close the first vent 28, and/or via control of the second vent 58 with the second tether release 62 and the tether retractor 34 to open and close the second vent 58. For example, the first vent 28 may be opened and the second vent 58 closed to provide a softer left side and firmer right side to the airbag 26. The first vent 28 and/or second vent 58 may be controlled based on a position of the occupant 39, e.g., such that a side, e.g., the right side or the left side, of the airbag 26 is firmer when the occupant 39 is at such side, e.g., to urge the occupant toward a center of the airbag 26. The first vent 28 and/or second vent 58 may be controlled based on a direction of a vehicle impact, e.g., from a right side or left side of the vehicle 22, such that a side of the airbag 26 that corresponds to the direction of the vehicle impact is firmer. The first vent 28 and/or second vent 58 may be controlled based on a size and/or a position of the occupant of the occupant 39, e.g., relative to the instrument panel 28, as described above.

The vehicle 22 may be any passenger or commercial automobile such as a car, a truck, a sport utility vehicle, a crossover vehicle, a van, a minivan, a taxi, a bus, etc.

The vehicle 22 defines a vehicle-longitudinal axis A1, i.e., extending between a front and a rear of the vehicle 22. The vehicle 22 defines a cross-vehicle axis A2, i.e., extending between a left side and a right side of the vehicle 22. The cross-vehicle axis A2 and the vehicle-longitudinal axis A1 are perpendicular to each other. The front, rear, left side, and right side may be relative to an orientation of an operator, e.g., the occupant 39, of the vehicle 22. The front, rear, left side, and right side may be relative to an orientation of controls for operating the vehicle 22, e.g., the instrument panel 38, etc. The front, rear, left side, and right side may be relative to a forward driving direction when wheels of the vehicle 22 are all parallel with each other.

The vehicle 22 includes a passenger cabin to house occupants 38, if any, of the vehicle 22. The passenger cabin includes one or more front seats 40 disposed at a front of the passenger cabin and one or more back seats disposed behind the front seats 40. The passenger cabin may also include third-row seats at a rear of the passenger cabin. The position and orientation of the seats and components thereof may be adjustable by an occupant 39. The seat 40 shown is a bucket seat, but alternatively the seat 40 may be a bench seat or another type of seat.

Figure 1:
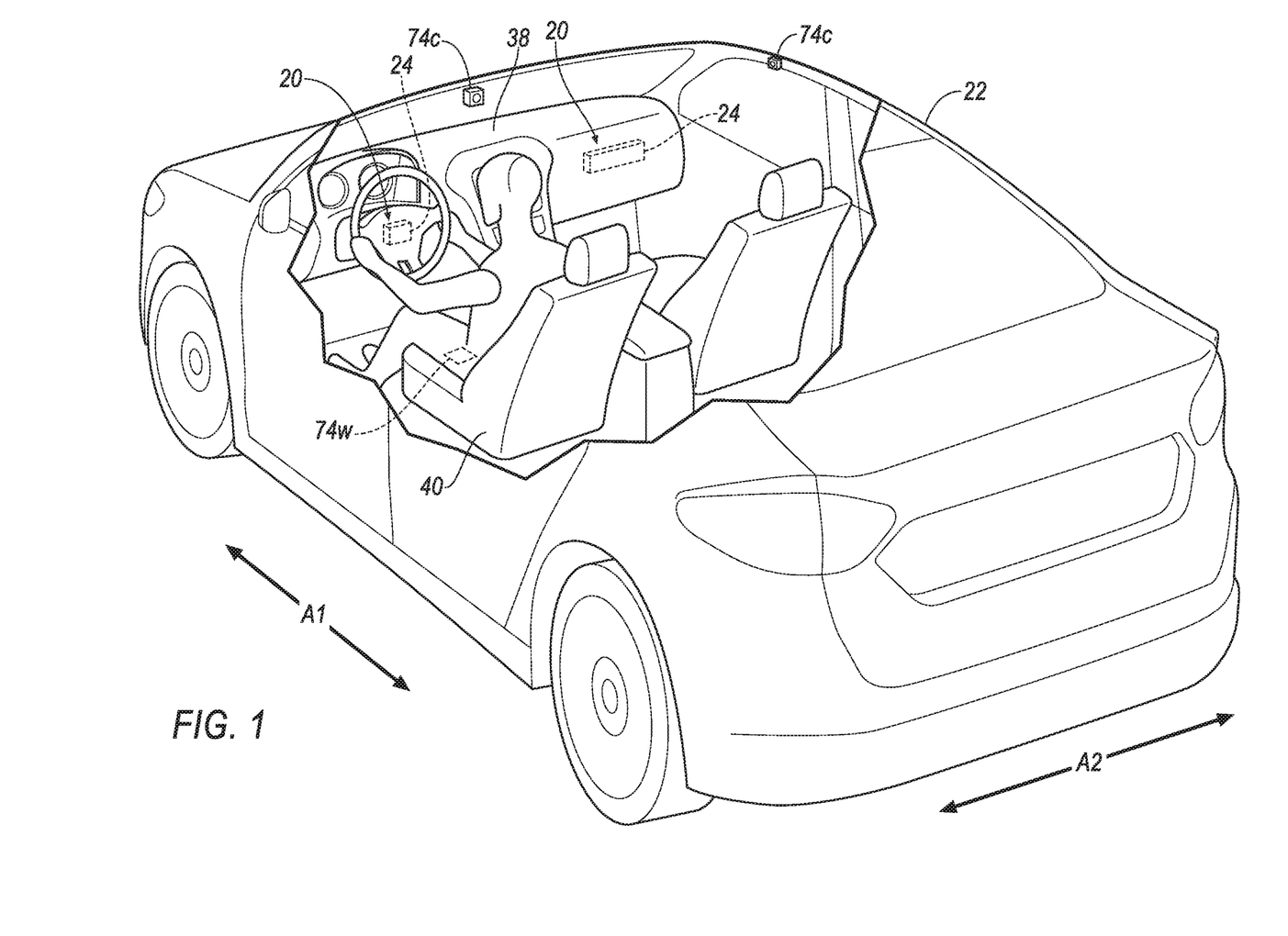
FIG. 1 is a perspective view of a vehicle having airbag assemblies in uninflated positions.
Figure 2:
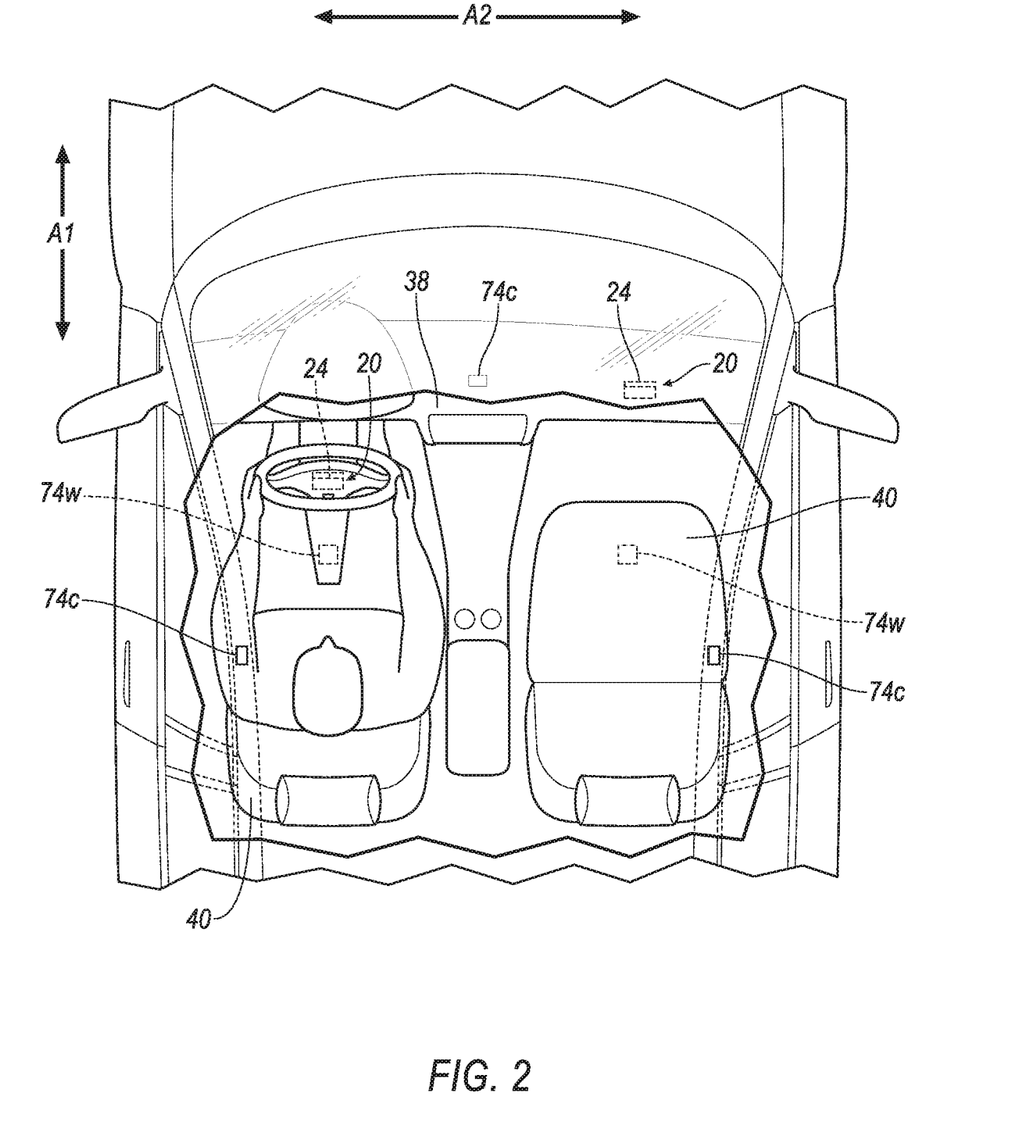
FIG. 2 is a top view of the vehicle having the airbag assemblies in uninflated positions.

The airbag assembly 20 may include the housing 24 supporting the airbag 26. The airbag 26 may be disposed in the housing 24 in the uninflated position, shown in FIGS. 1 and 2. The housing 24 provides a reaction surface for the airbag 26 in an inflated position, shown in FIGS. 3-6. The housing 24 may be supported by the instrument panel 38 of the vehicle 22, or any other suitable location of the vehicle 22. The housing 24 may be formed of any material, e.g., a rigid polymer, a metal, a composite, etc.

The airbag assembly 20 includes an inflator 42 in fluid communication with the airbag 26, e.g., directly, via piping, etc. The inflator 42 may be supported by and/or disposed in the housing 24. Upon receiving an instruction, e.g., a signal, from a computer 36, the inflator 42 inflates the airbag 26 with an inflation medium, such as a gas. The inflator 42 may be, for example, a pyrotechnic inflator that uses a chemical reaction to drive inflation medium to the airbag 26. The inflator 42 may be of any suitable type, for example, a cold-gas inflator.

The airbag 26 is inflatable from the uninflated position to the inflated position. The airbag 26 in the inflated position defines a chamber 44. The airbag 26 is supported by the housing 24, e.g., in the uninflated position and in the inflated position. The airbag 26 may be formed of fabric, such as a woven polymer, or any other material. As one example, the airbag 26 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 3:
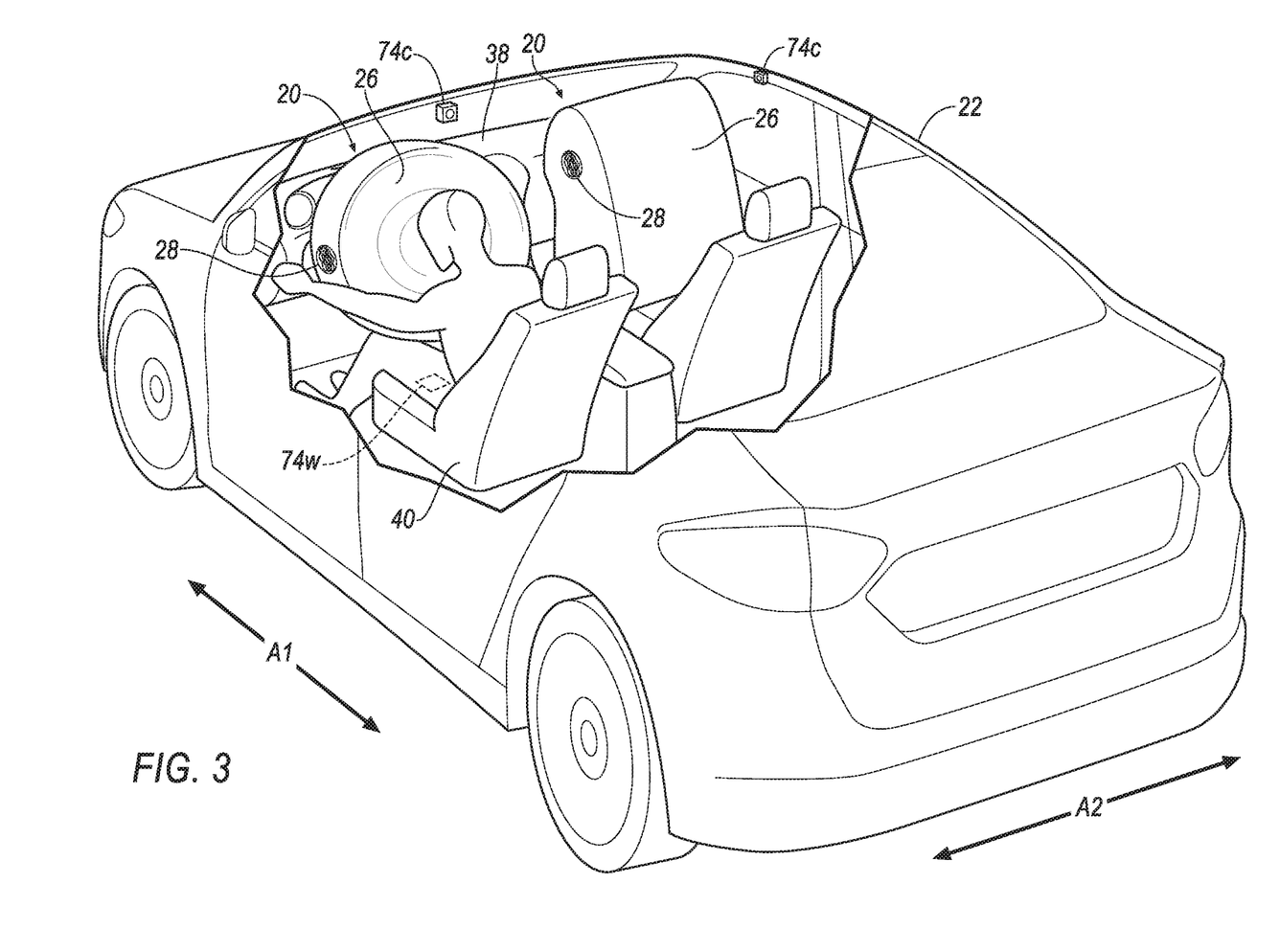
FIG. 3 is a perspective view of the vehicle having the airbag assemblies in inflated positions.
Figure 4:
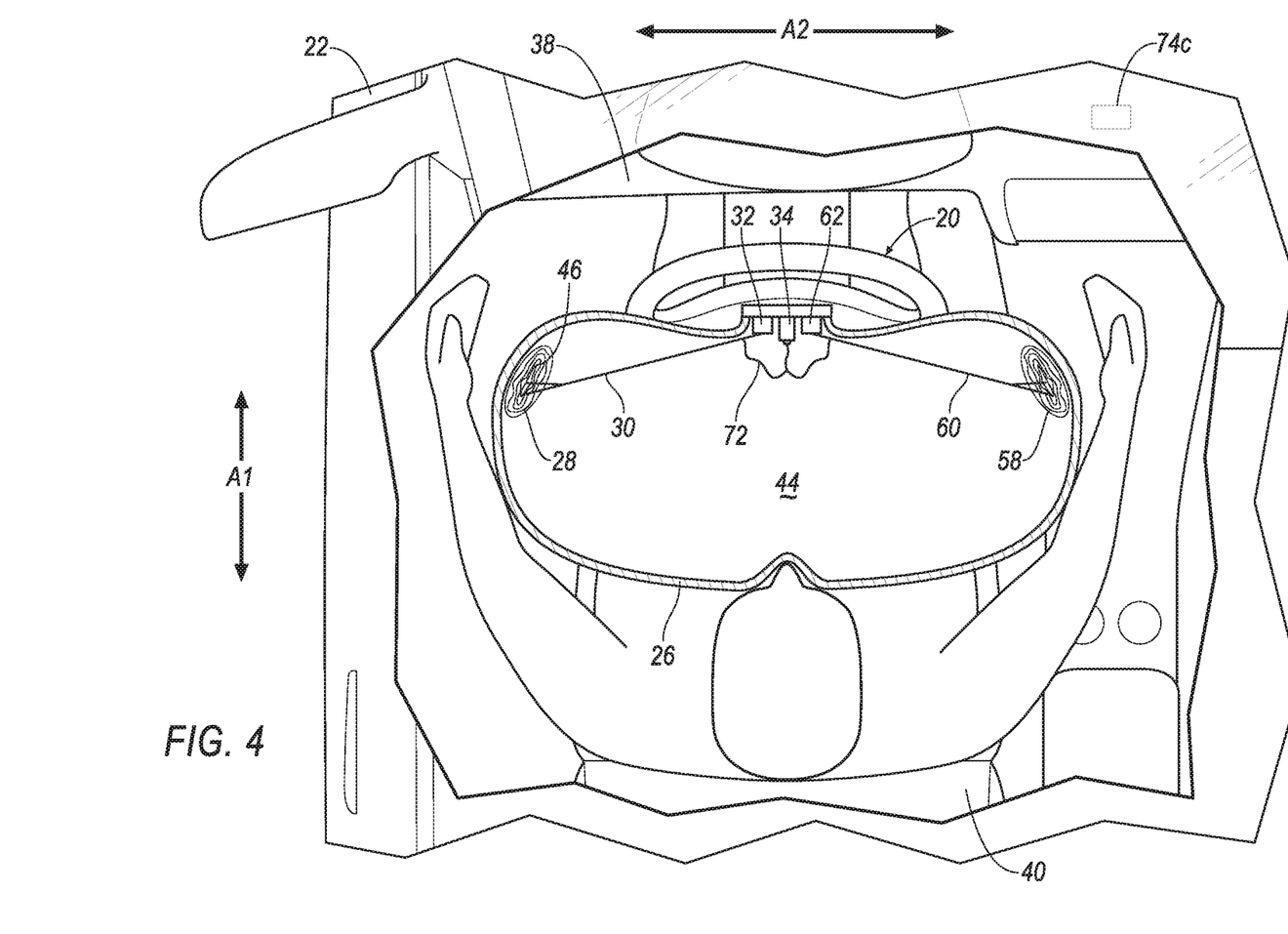
FIG. 4 is a top cross section of one of the airbag assemblies in the inflated position and having vents in closed positions.
Figure 5:
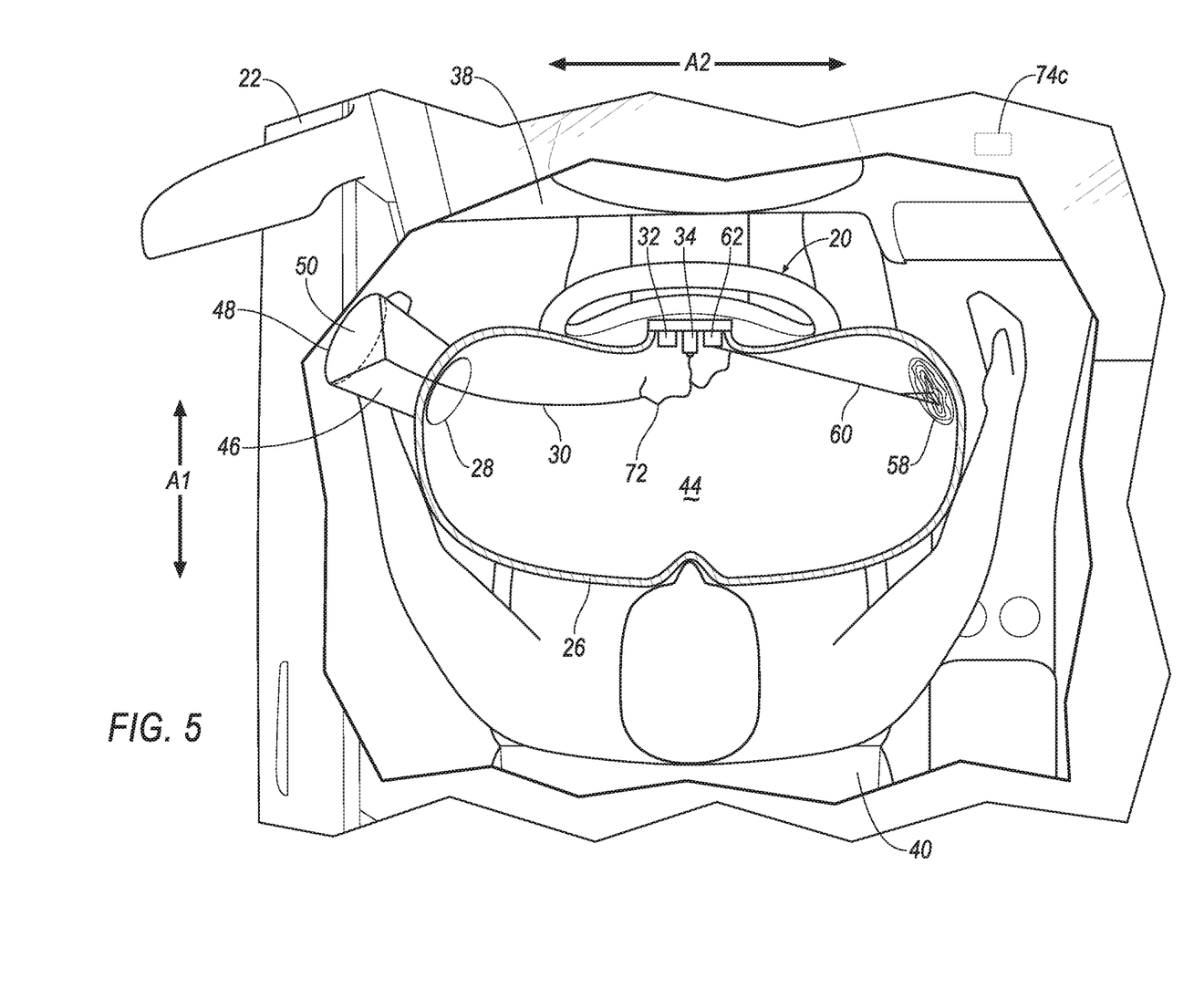
FIG. 5 is a top cross section of one of the airbag assemblies in the inflated position and having a tether that is released and having one of the vents in an open position.
Figure 6:
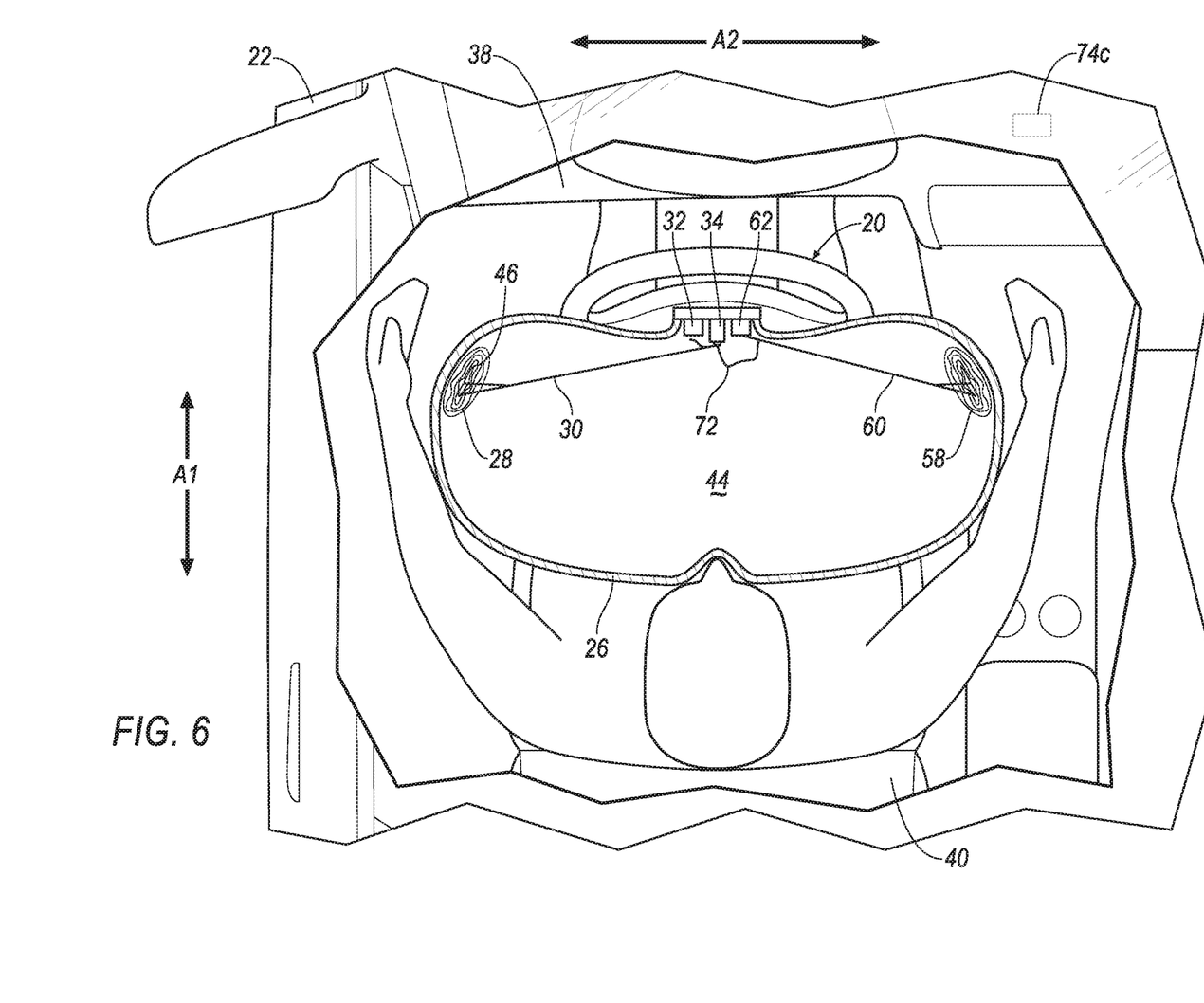
FIG. 6 is a top cross section of one of the airbag assemblies in the inflated position and having the tether that is retracted and having the vents in the closed positions.

The first vent 28 moves between the open position, shown in FIG. 5, and the closed position, shown in FIGS. 3, 4, and 6. The first vent 28 in the open position permits fluid, such as inflation medium from the inflator 42, to exit the chamber 44 via the first vent 28. The first vent 28 in the closed position restricts fluid flow from the chamber 44 out of the first vent 28. For example, the first vent 28 may include be a tube 46 extending from the airbag 26 to a distal end 48. The tube 46 may define a passage 50 that permits fluid to flow through the tube 46. The tube 46 may be collapsed and positioned abutting or inside the airbag 26 in the closed position, e.g., held in place by first tether 30. The tube 46 may extend away from the airbag 26 in the open position, e.g., when not held in place by the first tether 30. The first vent 28 may be of any other suitable design. For example, the first vent 28 may define an opening and include a flap that selectively covers the opening based on whether tension is applied from the first tether 28, e.g., the flap covers the opening in the closed position and does not cover the opening in closed position (not shown).

The airbag 26 may include the second vent 58. The second vent 58 may be as described above for the first vent 28, e.g., the second vent 58 move between the open position and the closed position to permit or restrict fluid flow from the chamber 44. The second vent 58 may be implemented as described for the first vent 28.

Moving the first vent 28 and/or the second vent 58 to the open position or the closed position controls a firmness of the airbag 26 in the inflated position. For example, the more fluid that is permitted to flow out of the chamber 44, e.g., via the first vent 28 and/or the second vent 58, the softer the airbag 26 in the inflated positions.

The first vent 28 may be spaced from the second vent 58 along the cross-vehicle axis A2 when the airbag 26 is in the inflated position. The chamber 44 may be between the first vent 28 and the second vent 58. For example, the first vent 28 may be on a left side of the airbag 26 and the second vent 58 may be on a right side of the airbag 26, e.g., relative to the right side and the left side of the vehicle 22, with the chamber 44 therebetween.

Spacing the first vent 28 from the second vent 58 along the cross-vehicle axis A2 enables the airbag 26 to have a firm side and a soft side, relative to each other, in the inflated position. For example, when the first vent 28 is in the open position and the second vent 58 is in the closed position, the side of the airbag 26 with the first vent 28 is softer and the side of the airbag 26 with the second vent 58 is firmer, relative to each other. Having soft and firm sides of the airbag 26 enables the airbag 26 to control kinematics of an occupant 39, e.g., an occupant 39 contacting the airbag 26 during a vehicle impact will move toward the softer side.

The first tether 30 controls the first vent 28. The first tether 30 may be fabric, as described above for the airbag 26, or any other suitable material. The first tether 30 is supported by the housing 24. For example, the first tether 30 may be coupled to the first tether release 32 with the first tether release 32 fixed to the housing 24. As another example, the first tether 30 may be fixed to the housing 24, e.g., via a fastener, adhesive, or the like. The first tether 30 is fixed to the first vent 28, e.g., to the distal end 48 of the tube 46, to the flap, etc. For example, the first tether 30 may be fixed to the first vent 28 via fastener, adhesive, friction welding, etc. As another example, the first tether 30 and the first vent 28 may be monolithic, i.e., a continuous one-piece construction.

The airbag assembly 20 may include the second tether 60. The second tether 60 controls the second vent 58. The second tether 60 may be fabric, as described above for the airbag 26, or any other suitable material. The second tether 60 is supported by the housing 24. For example, the second tether 60 may be coupled to the second tether release 62 with the second tether release 62 fixed to the housing 24. As another example, the second tether 60 may be fixed to the housing 24, e.g., via a fastener, adhesive, or the like. The second tether 60 is fixed to the second vent 58, e.g., to a distal end of a tube of the second vent 58, to a flap of the second vent 58, etc. For example, the second tether 60 may be fixed to the second vent 58 via fastener, adhesive, friction welding, etc. As another example, the second tether 60 and the second vent 58 may be monolithic, i.e., a continuous one-piece construction.

The first tether release 32 is operatively coupled to the first tether 30, e.g., to secure the first tether 30 prior to actuation, and to actuate and release the first tether 30, e.g., in response to an instruction from the computer 36. The first tether release 32 may be of any suitable type for releasing or severing a tether. The first tether release 32, for example, may be actuated mechanically, pneumatically, hydraulically, etc. and may include pin-type releases, cutter type releases, etc.

The first tether release 32 extends from the housing 24 to the first tether 30. For example, the first tether release 32 may be fixed to the housing 24, e.g., via a fastener, an adhesive, etc., and may be secured to the first tether 30 prior to actuation.

The airbag assembly 20 may include the second tether release 62. The second tether release 62 may be operatively coupled to the second tether 60, e.g., to secure the second tether 60 prior to actuation and to actuate and release the second tether 60 in response to an instruction from the computer 36. The second tether release 62 may be implemented as described above for the first tether release 32.

The second tether release 62 extends from the housing 24 to the second tether 60. For example, the second tether release 62 may be fixed to the housing 24, e.g., via a fastener, an adhesive, etc., and may be secured to the second tether 60 prior to actuation.

Figure 7:
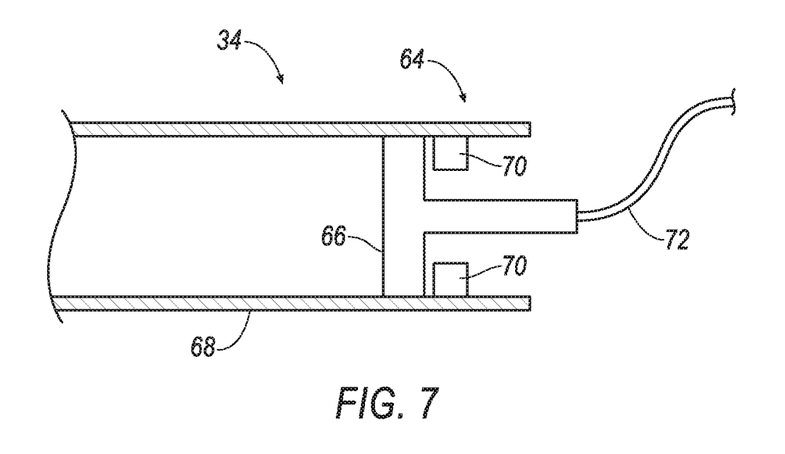
FIG. 7 is a top cross section of a tether retractor of one of the airbag assemblies.
Figure 8:
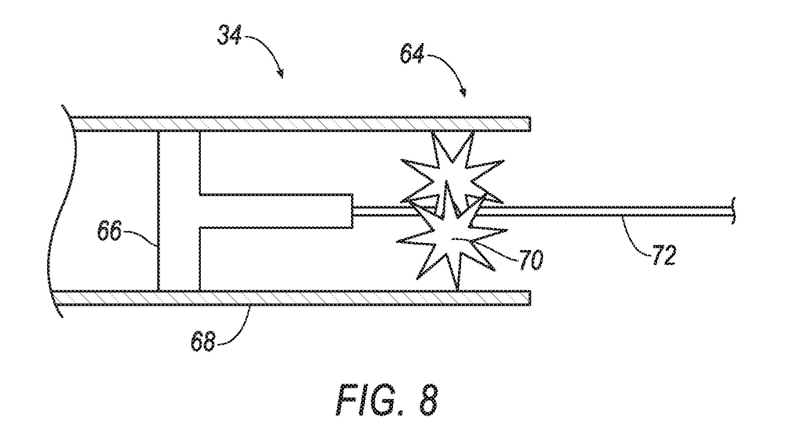
FIG. 8 is a top cross section of the tether retractor of one of the airbag assemblies retracting the tether.

The tether retractor 34 generates tension in the first tether 30 and/or the second tether 60, e.g., in response to an instruction from the computer 36. The tether retractor 34 is supported by the housing 24. For example, the tether retractor 34 may be fixed to the housing 24 via a fastener, an adhesive, etc. The tether retractor 34 may include an actuator 64, shown in FIGS. 7 and 8. The actuator 64 may be a pyrotechnic actuator, or any other type, e.g., mechanical, hydraulic, pneumatic, etc. For example, the tether retractor 34 may include a piston 66 and a cylinder 68. Pyrotechnic material 70 may be in the cylinder 68 adjacent the piston 66. Actuation of the pyrotechnic material 70, e.g., in response to an instruction from the computer 36, may generate gas and urge the piston 66 within the cylinder 68, as shown in FIG. 8.

A shown in FIGS. 4-8, the tether retractor 34 is fixed to the first tether 30 and/or the second tether 60. For example, the first tether 30 and the second tether 60 may be fixed to the actuator 64, e.g., to the piston 66 via fastener, adhesive, etc. As another example, the tether retractor 34 may include a cord 72. The cord 72 may connect the actuator 64 to the first vent 28 and/or the second vent 58. For example, the cord 72 may extend from the actuator 64, e.g., from the piston 66, to both the first tether 30 and the second tether 60. To put it another way, the cord 72 may have a Y-shape that includes a trio of distal ends. One of the distal ends may be fixed to the actuator 64, one of the ends may be fixed to the first tether 30, and one of the ends may be fixed to the second tether 60. The cord 72 may be fixed to the first tether 30 between the first vent 28 and the first tether release 32. The cord 72 may be fixed to the second tether 60 between the second vent 58 and the second tether release 62.

Figure 9:
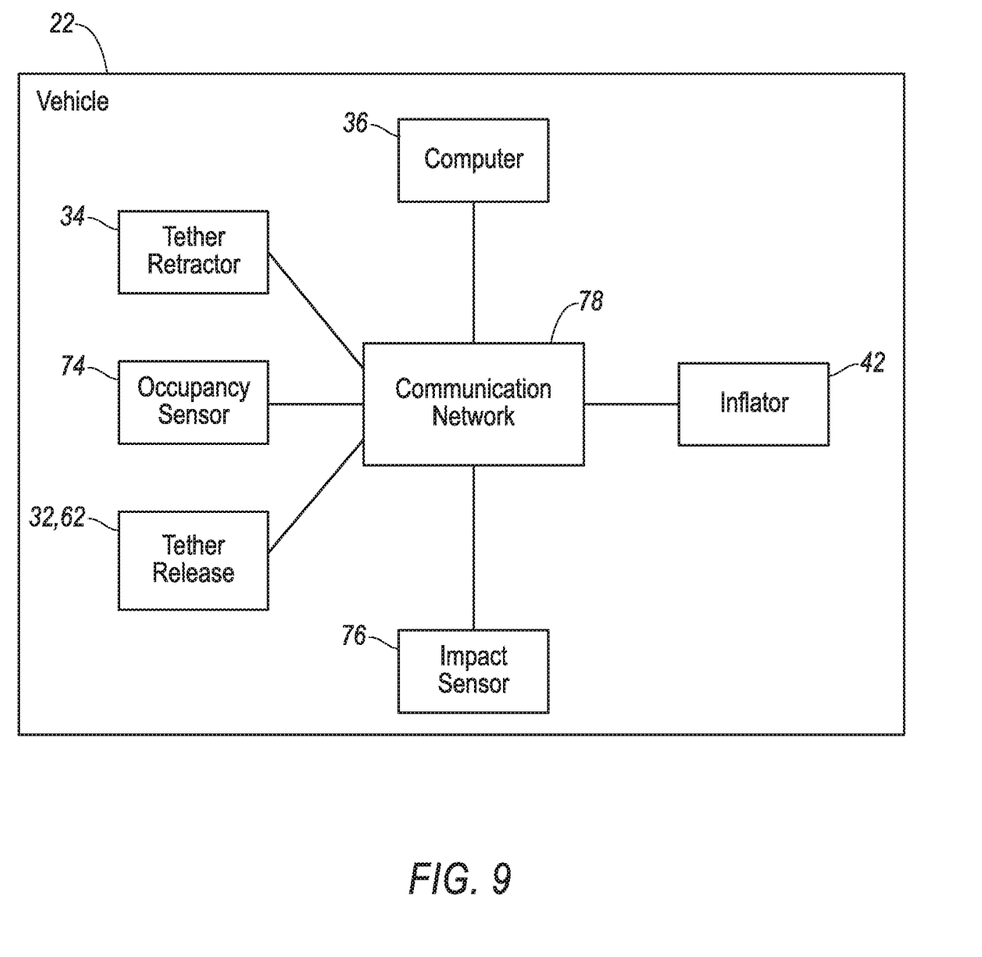
FIG. 9 is a block diagram of components of the vehicle.

The vehicle 22 may include an occupancy sensor 74, shown in FIG. 9, configured to detect occupancy of the seat 40. The occupancy sensor 74 may be visible-light or infrared cameras 74c, weight sensors 74w, proximity sensors, or other suitable sensors, shown in FIGS. 1-6.

The vehicle 22 may include an impact sensor 76, shown in FIG. 9. The impact sensor 76 may be in communication with the computer 36. The impact sensor 76 is programmed to detect an impact to the vehicle 22. The impact sensor 76 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 76 may be located at numerous points in or on the vehicle 22.

The vehicle 22 may include a communication network 78, shown in FIG. 9. The communication network 78 includes hardware, such as a communication bus, for facilitating communication among vehicle 22 components. The communication network 78 may facilitate wired or wireless communication among the vehicle 22 and airbag assembly 20 components, such as the first tether release 32, the second tether release 62, the tether retractor 34, the computer 36, the impact sensors 76, the occupancy sensors 74, etc., in accordance with a number of communication protocols such as controller area network (CAN), Ethernet, WiFi, Local Interconnect Network (LIN), and/or other wired or wireless mechanisms.

The computer 36 may be a microprocessor-based computer implemented via circuits, chips, or other electronic components. For example, the computer 36 may include a processor, a memory, etc. The memory of the computer 36 may include memory for storing instructions executable by the processor as well as for electronically storing data and/or databases. Although one computer 36 is shown in FIG. 9 for ease of illustration, it is to be understood that the computer 36 could include, and various operations described herein could be carried out by, one or more computing devices.

The computer 36 may be programmed to identify a position of the occupant 39 of the vehicle 22. The computer 36 may identify the position of the occupant 39 based on information received from the occupancy sensors 74, e.g., from the cameras 74c, proximity sensors, etc. For example, the computer 36 may identify a position of the occupant 39 relative to the left side and/or the right side of the vehicle 22 along the cross-vehicle axis A2, relative to the instrument panel 38 along the vehicle-longitudinal axis A1, etc. For example, image data from the camera 74c may be analyzed using image recognition techniques to identify a position of the occupant 39 along the cross-vehicle axis A2, e.g., a distance from the occupant 39 to the left side of the vehicle 22 and/or the right side of the vehicle 22, a distance from the occupant 39 from a frame of an image of the passenger cabin taken from a front of the passenger cabin, etc. As another example, image data from the camera 74c may be analyzed using image recognition techniques to identify a position of the occupant 39 along the vehicle-longitudinal axis A1, e.g., a distance from the occupant 39 to the instrument panel 38, a distance from the occupant 39 from a frame of an image of the passenger cabin taken from a left or right side of the passenger cabin, etc. Other techniques may be used by the computer 36, e.g., information from proximity sensors may indicate a distance of the occupant 39 from the instrument panel 38, the right side, the left side, etc.

The computer 36 may be programmed to identify a size of the occupant 39 of the vehicle 22. For example, the computer 36 may identify a weight of the occupant 39 based on information received from the weight sensor 74w in the seat 40, e.g., when the occupant 39 is seated in the seat 40.

The computer 36 may be programmed to detect a vehicle impact. The computer 36 may detect a direction of the vehicle impact relative to the vehicle 22, e.g., a frontal impact, an oblique impact on the right side of the vehicle 22, an oblique impact on the left side of the vehicle 22, etc. The computer 36 may detect the vehicle impact based on information received from the impact sensor 76, e.g., via the communication network 78.

The computer 36 may be programmed to inflate the airbag 26. For example, the computer 36 may send a signal to the inflator 42, e.g., via the communication network 78, to actuate and provide inflation medium. The inflation medium flows into the airbag 26, e.g., into the chamber 44, inflating the airbag 26 to the inflated position. The computer 36 may inflate the airbag 26 in response to detecting a vehicle impact.

The computer 36 may be programmed to actuate the first tether release 32 and/or the second tether release 62. For example, the computer 36 may send an actuation instruction to the first tether release 32 and/or the second tether release 62, e.g., via the communication network 78. The computer 36 may selectively actuate the first tether release 32 and/or the second tether release 62. To put it another way, the computer 36 may actuate the first tether release 32 and not the second tether release 62, or vice versa. For example, the first tether release 32 and the second tether release 62 may each be associated with their own address, e.g., identifying the first tether release 32 and the second tether release 62 as nodes on a network. The computer 36 may transmit the actuation instruction to one of such addresses, or to both.

The computer 36 may be programed to actuate the first tether release 32 and/or the second tether release 62 based on the detected position of the occupant 39. The computer 36 may actuate the first tether release 32 or the second tether release 62 to provide a firm side and a soft side to the airbag 26. Upon contacting the airbag 26, the occupant 39 is urged toward the soft side. The computer 36 may actuate the first tether release 32 or the second tether release 62 to open the first vent 28 or the second vent 58, e.g., to open which ever vent 28, 58 is on an opposite side of the detected position of the occupant 39 along the cross-vehicle axis A2. To put it another way, when the computer 36 detects the position of the occupant 39 as being closer to the right side of the airbag 26 than to the left side of the airbag 26, the computer 36 may actuate one of the tether releases 32, 62 to open the vent 28, 58 on the left side. For example, the computer 36 may store a lookup table associating various detected occupant positions along the cross-vehicle axis A2 with an actuation instruction for first tether release 32 or the second tether release 62.

The computer 36 may be programed to actuate the first tether release 32 and/or the second tether release 62 based on a detected direction of the vehicle impact. The computer 36 may actuate the first tether release 32 or the second tether release 62 to open the first vent 28 or the second vent 58, e.g., to open which ever vent 28, 58 is on an opposite side of the detected direction of the vehicle impact, e.g., when the vehicle impact is an oblique impact to the right side or the left side of the vehicle 22. To put it another way, when the computer 36 detects the direction of the vehicle impact as being to the right side or the left side of the vehicle 22, the computer 36 may actuate the one of the tether releases 32, 62 to open the vent 28, 58 on the opposite side. For example, when the computer 36 detects an oblique impact to the right side of the vehicle 22, the computer 36 may actuate the first tether release 32 or the second tether release 62 to open the vent 28, 58 on the left side. For example, the computer 36 may store a lookup table associating various impact directions with an actuation instruction for first tether release 32 or the second tether release 62.

The computer 36 may be programmed to actuate the tether retractor 34. For example, the computer 36 may send an instruction to the tether retractor 34, e.g., via the communication network 78, instructing actuation.

The computer 36 may be programmed to identify an amount of time to wait between actuation of the tether release(s) 32, 62 and actuation the tether retractor 34. The amount of time varies a firmness over time of the airbag 26 in the inflated position. For example, the greater the amount of time, the longer the vents 28, 58 are open providing a soft airbag 26. The computer 36 may identify the amount of time based on the detected size of the occupant 39. The amount of time may be inverse to the detected size of the occupant 39. For example, the computer 36 may identify a shorter amount of time for a heavier occupant and a longer amount of time for a lighter occupant. For example, the computer 36 may store a lookup table or the like associating various detected weights, or ranges of weights, with various amounts of time.

The computer 36 may be programmed to actuate the tether retractor 34 based on the detected position of the occupant 39. As discussed above, actuation of the tether retractor 34 closes the first vent 28 and/or the second vent 58 and increases a firmness of the airbag 26 in the inflated position. The computer 36 may actuate the tether retractor 34 to close the vents 28, 58 when the position of the occupant 39 is within a threshold distance of the instrument panel 38, e.g., to increase firmness the airbag 26 and help control kinematics of the occupant 39 to prevent or reduce impact with the instrument panel 38.

Figure 10:
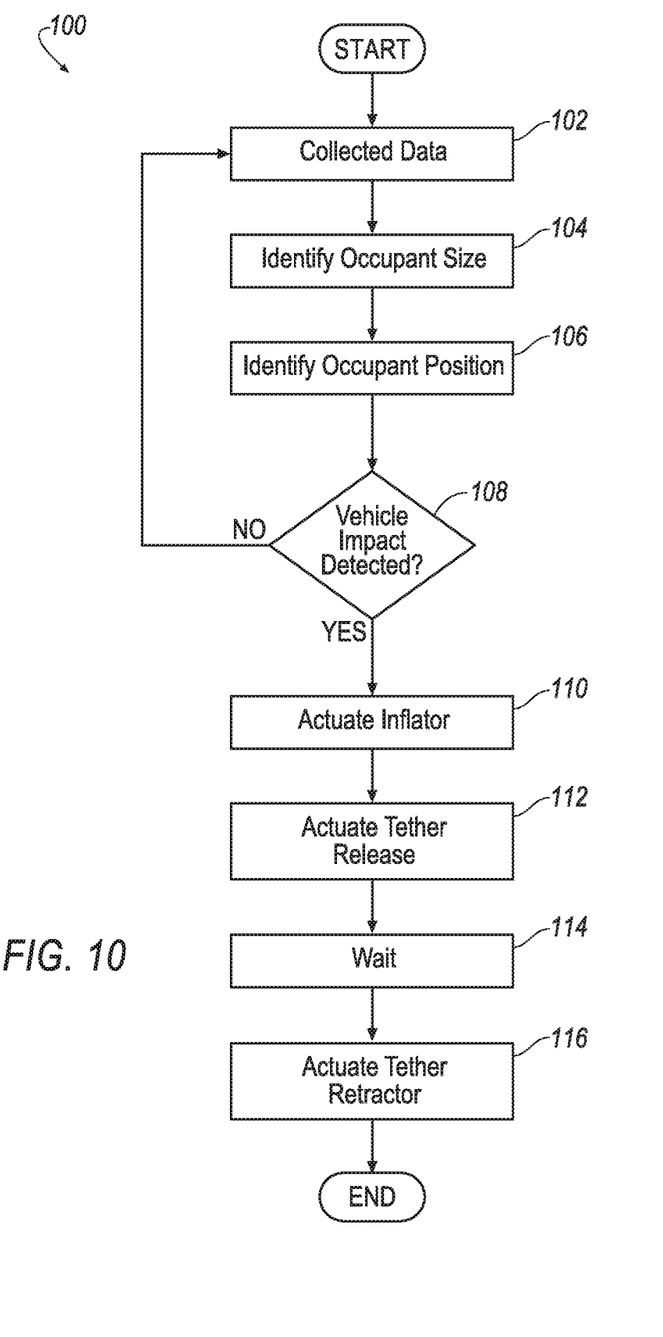
FIG. 10 is an illustration of a flow chart for a method of controlling one of the airbag assemblies.

FIG. 10 is a process flow diagram illustrating an exemplary process 100 for controlling the airbag assembly 20. The process 100 begins in a block 102 where the computer 36 receives data, e.g., from the occupancy sensors 74, the impact sensors 76, etc., via the communication network 78. The computer 36 may continue to receive data throughout the process 100. Throughout the process 100 in the present context means substantially continuously or at time intervals, e.g., every 10 milliseconds.

Next in a block 104 the computer 36 identifies a size of the occupant 39 of the vehicle 22. The computer 36 may identify the size, e.g., the weight, of the occupant 39 based on information from the occupancy sensor 74, e.g., from weight sensors 74w, etc., e.g., as discussed above.

Next in a block 106 the computer 36 identifies a position of the occupant 39 in the vehicle 22. The computer 36 may identify the position of the occupant 39 based on information from the occupancy sensor 74, e.g., from one or more cameras 74c, proximity sensors, weight sensors 74w, etc., e.g., as discussed above. The computer 36 may continue to identify the position of the occupant 39 throughout the process 100, e.g., as the position of the occupant 39 in the vehicle 22 changes over time.

Next in a block 108 the computer 36 determines whether a vehicle impact has been detected, e.g., based on information from one or more impact sensors 76. Additionally the computer 36 may detect a direction of the vehicle impact. When the computer 36 determines a vehicle impact has been detected the process 100 moves to a block 110. When the computer 36 determines a vehicle impact has not been detected the process 100 returns to the block 102.

In the block 110 the computer 36 actuates the inflator 42 to inflate the airbag 26. For example, the computer 36 may transmit an instruction to the inflator 42 via the communication network 78, e.g., as described herein.

In a block 112 the computer 36 actuates the first tether release 32 and/or the second tether release 62. For example, the computer 36 may transmit an instruction to the first tether release 32 and/or the second tether release 62 via the communication network 78, e.g., as described herein. The computer 36 may actuate the first tether release 32 and/or the second tether release 62 in response to determining a vehicle impact has been detected in the block 108 and based on a detected direction of such impact. The computer 36 may actuate the first tether release 32 and/or the second tether release 62 based on the identified position of the occupant 39 from the block 106. The computer 36 may actuate the first tether release 32 and/or the second tether release 62 before, during, or after actuating the inflator 42 in the block 110.

Next in a block 114 the computer 36 waits an amount of time. The computer 36 may identify the amount of time based on the detected size of the occupant 39 from the block 104.

In a block 116 the computer 36 actuates the tether retractor 34. The computer 36 may actuate the tether retractor 34 after waiting the amount of time in the block 114. The computer 36 may actuate the tether retractor 34 based on the detected position of the occupant 39 from the block 106, e.g., as described herein. After the block 116 the process 100 may end.

Computing devices, such as the computer 36, generally include computer-executable instructions, where the instructions may be executable by one or more computing devices such as the computer. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly, comprising:
a housing;
an airbag supported by the housing and including a vent movable between an open position and a closed position;
a tether supported by the housing and fixed to the vent, the tether controlling movement of the vent between the open position and the closed position;
a tether release operatively coupled to the tether; and
a tether retractor supported by the housing and fixed to the tether.

2. The airbag assembly of claim 1, further comprising a processor and a memory storing instructions executable by the processor to actuate the tether release and then actuate the tether retractor.

3. The airbag assembly of claim 1, wherein the tether release extends from the housing to the tether.

4. The airbag assembly of claim 1, wherein the airbag includes a second vent, and further comprising a second tether supported by the housing and fixed to the second vent, and a second tether release operatively coupled to the second tether.

5. The airbag assembly of claim 4, wherein the tether retractor includes an actuator and a cord extending from the actuator to both the tether and the second tether.

6. The airbag assembly of claim 4, wherein the airbag is inflatable to an inflated position and defines a chamber between the vent and the second vent in the inflated position.

7. The airbag assembly of claim 1, wherein the tether retractor includes an actuator and a cord connecting the actuator to the vent.

8. The airbag assembly of claim 7, wherein the actuator is a pyrotechnic actuator.

9. A vehicle, comprising:
a housing;
an airbag supported by the housing and including a vent movable between an open position and a closed position;
a tether supported by the housing and fixed to the vent, the tether controlling movement of the vent between the open position and the closed position;
a tether release operatively coupled to the tether;
a tether retractor supported by the housing and fixed to the tether;
an impact sensor;
a processor; and
a memory storing instructions executable by the processor to inflate the airbag in response to detecting a vehicle impact based on data from the impact sensor.

10. The vehicle of claim 9, further comprising an occupancy sensor, and wherein the memory further stores instructions to actuate the tether release and then actuate the tether retractor based on a detected position of a vehicle occupant indicated by data from the occupancy sensor.

11. The vehicle of claim 9, wherein the tether release extends from the housing to the tether.

12. The vehicle of claim 9, wherein the tether retractor includes an actuator and a cord connecting the actuator to the vent.

13. The vehicle of claim 9, wherein the memory further stores instructions to actuate the tether release and then actuate the tether retractor.

14. The vehicle of claim 13, further comprising an occupancy sensor, and wherein the memory further stores instructions to identify an amount of time to wait between actuation of the tether release and the tether retractor based on data from the occupancy sensor indicating a detected size of a vehicle occupant.

15. The vehicle of claim 9, wherein the airbag includes a second vent, and further comprising a second tether supported by the housing and fixed to the second vent, and a second tether release operatively coupled to the second tether.

16. The vehicle of claim 15, wherein the airbag is inflatable to an inflated position and defines a chamber between the vent and the second vent along a cross-vehicle axis in the inflated position.

17. The vehicle of claim 15, wherein the memory further stores instructions to actuate one of the tether release or the second tether release based on a detected direction of the vehicle impact indicated by data from the impact sensor.

18. The vehicle of claim 15, further comprising an occupancy sensor, and wherein the memory further stores instructions to actuate one of the tether release or the second tether release based on a detected position of a vehicle occupant indicated by data from the occupancy sensor.

19. The vehicle of claim 15, wherein the tether retractor includes an actuator and a cord extending from the actuator to both the tether and the second tether.

* * * * *